US009267519B2

(12) United States Patent
Bus

(10) Patent No.: US 9,267,519 B2
(45) Date of Patent: Feb. 23, 2016

(54) SUPPORTING ELEMENT FOR AN OBJECT AND APPARATUS COMPRISING A SUPPORTING ELEMENT

(75) Inventor: Karolus Theodorus Wilhelmina Maria Bus, Vierlingsbeek (NL)

(73) Assignee: SMART LEVEL COMPANY B.V., Oostrum (NL)

(*) Notice: Subject to any disclaimer, the term of this patent is extended or adjusted under 35 U.S.C. 154(b) by 1162 days.

(21) Appl. No.: 13/201,068

(22) PCT Filed: Feb. 11, 2010

(86) PCT No.: PCT/NL2010/050064
§ 371 (c)(1),
(2), (4) Date: Sep. 28, 2011

(87) PCT Pub. No.: WO2010/093241
PCT Pub. Date: Aug. 19, 2010

(65) Prior Publication Data
US 2012/0018251 A1 Jan. 26, 2012

Related U.S. Application Data

(60) Provisional application No. 61/176,262, filed on May 7, 2009.

(30) Foreign Application Priority Data

Feb. 11, 2009 (EP) .................................... 09152567

(51) Int. Cl.
F16B 2/24 (2006.01)
E06C 7/44 (2006.01)
(52) U.S. Cl.
CPC .. F16B 2/246 (2013.01); E06C 7/44 (2013.01)

(58) Field of Classification Search
CPC .................................. F16B 2/246; E06C 7/44
USPC ............... 182/62.5, 69.4, 104, 107, 115, 116, 182/124–126, 165, 182.5, 200–202, 207, 182/209, 211, 225; 403/104; 248/188.5, 248/654.1; 292/306
See application file for complete search history.

(56) References Cited

U.S. PATENT DOCUMENTS 546,379 A * 9/1895 Colton .......................... 292/306
2,495,674 A * 1/1950 Lewis ........................... 248/410
(Continued)

OTHER PUBLICATIONS

International Search Report, dated May 17, 2010, from corresponding PCT application, PCT/NL2010/050064.

Primary Examiner — Charles A Fox
Assistant Examiner — Kristine Florio
(74) Attorney, Agent, or Firm — Young & Thompson

(57) ABSTRACT

A supporting element for an object includes a first leg member and a second leg member. The first leg member is axially movable relative to the second leg member for axially extending the supporting element. The first leg member includes a house that is arranged for slidably receiving the second leg member. The house includes a locking element having a locking position for locking the relative axial movement of the first leg member with respect to the second leg member, and having an open position for enabling relative axial movement of the two members. A catch may be provided in the locking element. The catch may be tiltably movable within the house for alternately acquiring the locking position and the open position of the locking element. The catch may include a cavity receiving the second leg, wherein the cavity has a stopping surface engaging at least opposed perimeter parts of the second leg member in a locking position of the locking element.

6 Claims, 7 Drawing Sheets

(56) References Cited

U.S. PATENT DOCUMENTS

| | | | |
|---|---|---|---|
| 2,806,723 A | | 9/1957 | Fairclough |
| 2,914,135 A | * | 11/1959 | Crouch .......................... 182/201 |
| 3,468,579 A | * | 9/1969 | Tabor ............................ 292/306 |
| 4,073,367 A | * | 2/1978 | Wright .......................... 182/204 |
| 4,147,231 A | * | 4/1979 | Chantler et al. .............. 182/172 |
| 5,595,410 A | | 1/1997 | Wilson et al. |
| 7,204,466 B2 | * | 4/2007 | Hsieh ............................ 248/410 |
| 7,222,892 B2 | * | 5/2007 | Guidetti ........................ 292/306 |
| 8,210,314 B1 | * | 7/2012 | Polak ............................ 182/201 |

\* cited by examiner

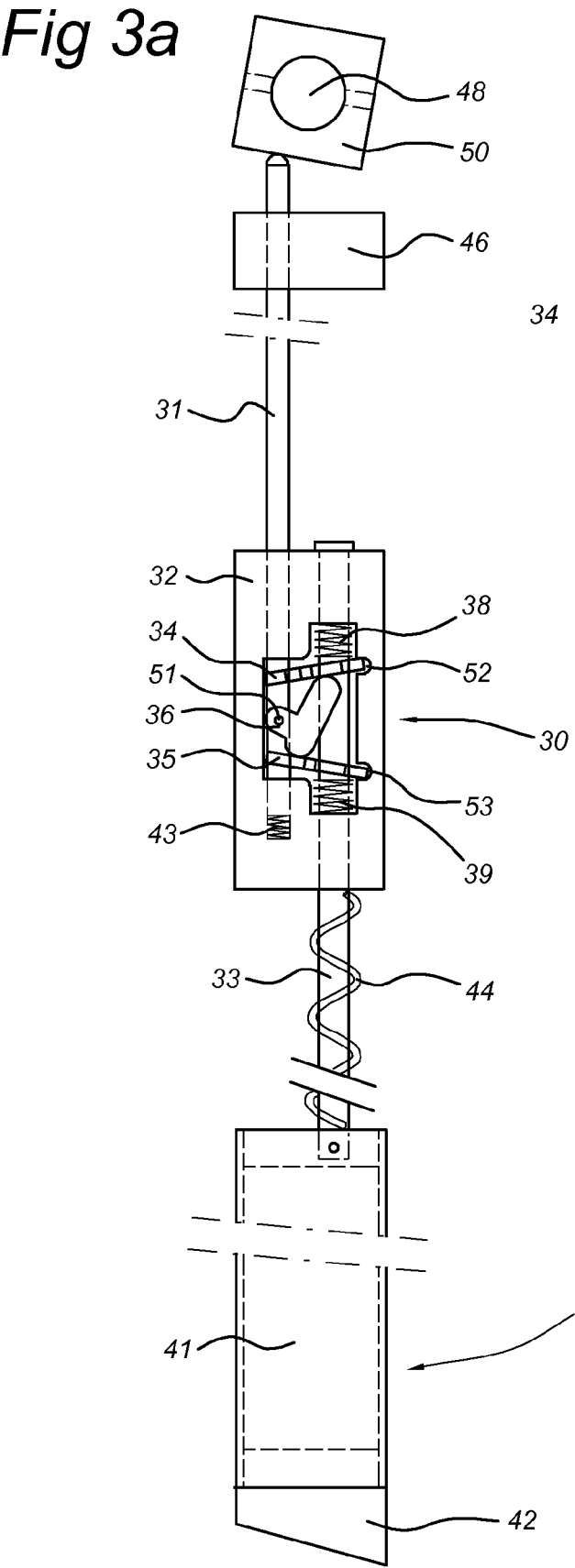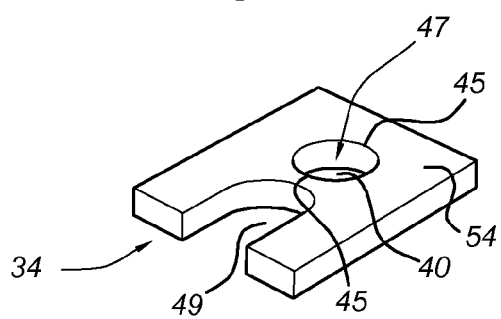
Fig 3a
Fig 3b

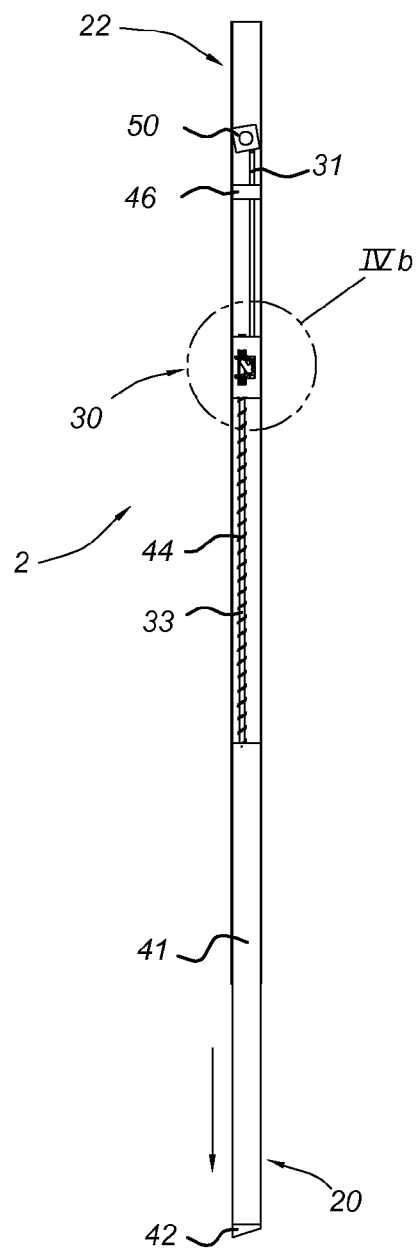
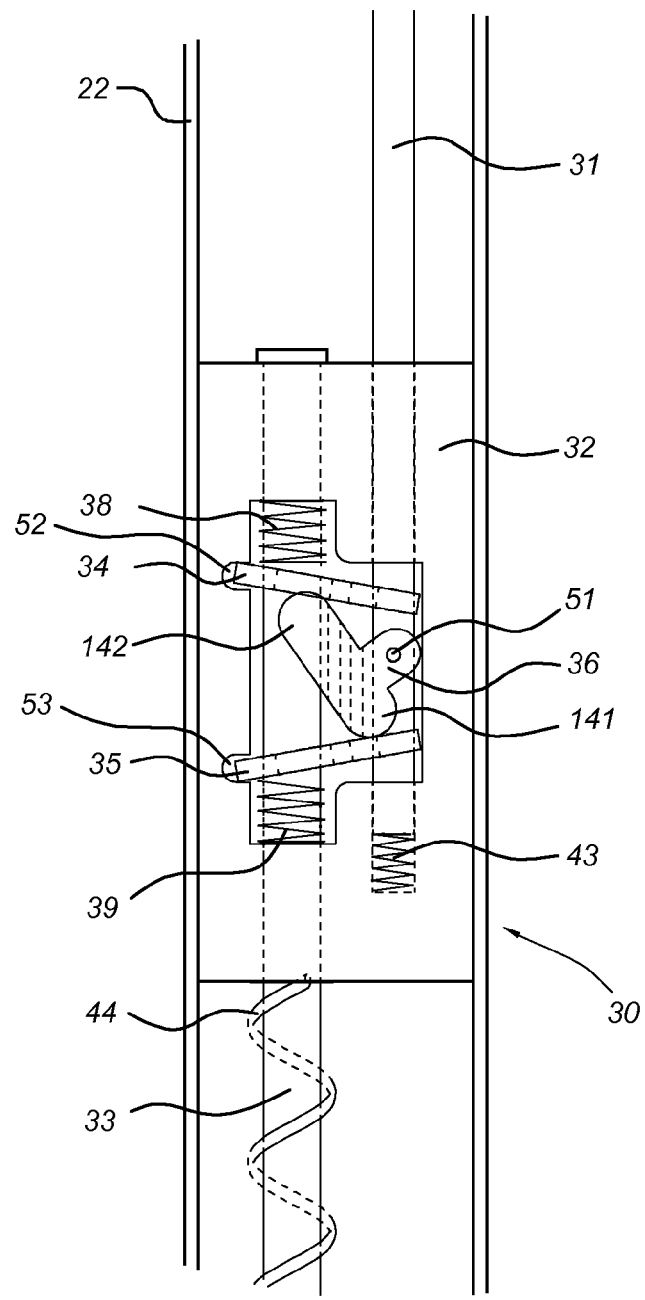

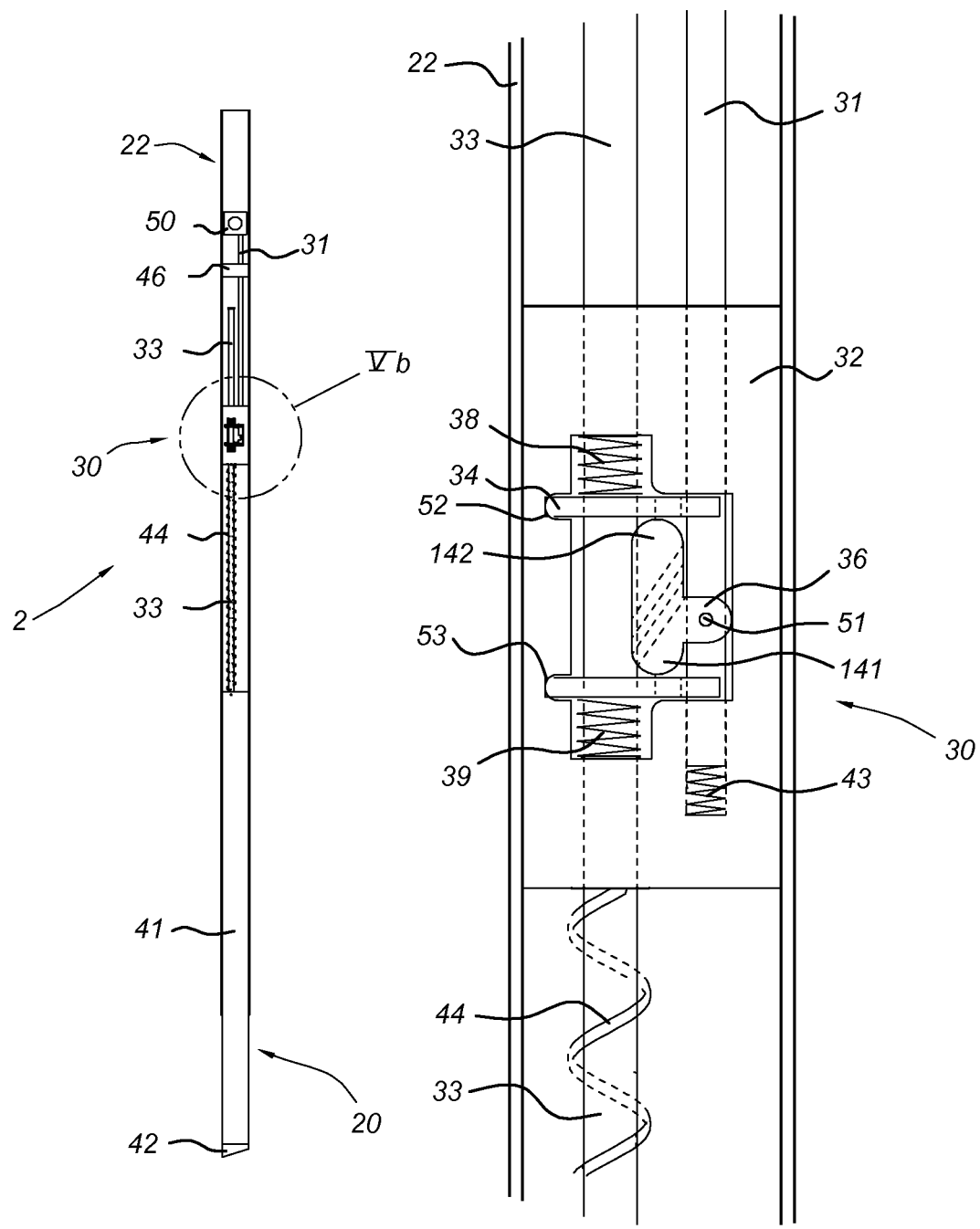

SUPPORTING ELEMENT FOR AN OBJECT AND APPARATUS COMPRISING A SUPPORTING ELEMENT

BACKGROUND OF THE INVENTION

The invention relates to a supporting element for an object, the supporting element comprising a first leg member and a second leg member, wherein the first leg member is axially movable relative to the second leg member for axially extending the support member.

The invention also relates to an apparatus comprising a frame having at least two legs, each leg comprising a supporting element of the aforementioned kind.

DESCRIPTION OF THE RELATED ART

A supporting element, an apparatus and a locking element of the aforementioned kind are well known from the prior art. The supporting element may for instance be an extendable leg member for a table or a ladder. The extendable leg member may be used for stabilizing the ladder or table when positioned on an uneven surface. By extending one or more legs of the object, it will be possible to carefully position the object in a desired manner. Furthermore, the extendable leg member may be used for positioning a surface of the object (such as a table top, or a bucket tray) in a level position.

In one embodiment, the supporting element from the prior art comprises two leg members, that may be slidably connected to each other. A fixation or locking mechanism may be provided for securing the two leg parts to each other, such that the extendable leg member may be fixed at a desired length. The fixation may consist of a pin or screw that is entered into holes provided on one or both leg parts.

Furthermore, a table or a ladder having one or more extendible legs is also known from prior art. By adjusting the length of one or more legs, the ladder may be positioned in a desired fashion.

It is a drawback of the prior art legs that adjusting the length thereof may be laborious and time consuming.

SUMMARY OF THE INVENTION

It is an object of the invention to provide a supporting element, such as a leg, wherein at least one of the drawbacks associated with the supporting elements according to the state of the art is resolved.

It is another object of the invention to provide an object comprising a supporting element, such as an adjustable leg, in which at least one of the known drawbacks is resolved.

To this end, the invention provides a supporting element for an object. The supporting element comprises a first leg member and a second leg member. The first leg member is axially movable relative to the second leg member for axially extending the support member. The first leg member comprises a house that is arranged for slidably receiving the second leg member. The house comprises a locking element having a locking position for locking the relative axial movement of the first leg member with respect to the second leg member, and having an open position for enabling relative axial movement of the two members. By positioning the locking element in a house, the locking element is less vulnerable to dirt and will stay relatively clean. Hence, the locking element will wear out less, ensuring a secure functioning of the locking element.

In an embodiment the locking element may comprise a catch that is tiltably movable within the house for alternately acquiring the locking position and the open position of the locking element. The catch may be a relatively flat plate. The catch may comprise a cavity receiving the second leg. The catch comprises a stopping surface surrounding at least a part of the perimeter of the cavity. The cavity may be a hole in the catch, or an open cavity in the catch. A part of the surface of the catch surrounding the cavity may be the stopping surface. The stopping surface may be relatively small, and may comprise a relatively small part of the cavity surface, such as the edge of the cavity. The open cavity may be U-shaped. In the open position of the locking element, the stopping surface is not in contact with the second leg member, such that the second leg member may freely slide in the house. The catch may be arranged such that in a locking position of the locking element the stopping surface engages at least opposed perimeter parts of the second leg member. Due to engaging opposed perimeter parts, the second leg member is fixed in the cavity. By tilting the cavity such that in a locking position the stopping surface engages opposed parts of the second leg member, a moment is exerted on the second leg member. This moment pushes the second leg member tightly to the house and the stopping surface (such as the edge) of the catch. The resulting static friction between the second leg member, and both the house and the stopping surface of the catch, ensures that a tight and safe fixation of the second leg member is possible. It is an additional advantage of the invention that the supporting element may be infinitely adjustable, i.e. that the supporting element may be fixed in any desired position, without having to settle for discrete positioning of the supporting element.

In an embodiment, the leg member comprises a biasing element that biases the supporting element towards an axially extended position. The biasing element may push the legs of the supporting element towards an axially extended position. When the locking element is idle (i.e. in an open position) this may lead the second leg element to move outwards. It may be possible that the supporting element moves towards a maximal extended position as a result of the force exerted by the biasing element.

Alternatively, it may be possible that the biasing element is arranged for balancing a certain weight that the supporting element is designed to support. This way, when the locking element is in an open position, the supporting element will neither extend nor shorten. This enables the user to relatively easily position the supporting leg in a desired position. The user may unlock the locking element, and then only a small amount of force is needed for adjusting the length of the supporting element.

In an embodiment the biasing force is of similar strength as the mass supported with the supporting element. If an apparatus comprises multiple supporting elements or legs, the biasing force of the multiple supporting elements combined corresponds with the supported mass. This will allow a 'floating sensation' to the supporting element/apparatus, when the supporting element/apparatus is positioned on a surface and the locking mechanism is in the open position allowing the leg to be extended or shortened, while the mass is supported by the biasing force. An operator can lift the apparatus upwardly or downwardly feeling little or no resistance.

In an embodiment the stopping surface is relatively small, and comprises the edge of the cavity. The edge may be relatively sharp, such that in a locking position the edge is pressed into the second leg member. The edge may cut into the second leg member. This ensures that a high locking pressure is obtained, resulting in a good resistance against relative movement of the two leg members.

In an embodiment, the longitudinal axis of the cavity extends parallel to the second leg member in an open position. The catch may be positioned perpendicular to the second leg in an open position, such that the cavity in the catch is parallel to the second leg. This way, the necessary space is provided for the second leg to move freely. Also, this way, only a small amount of tilting is needed for the catch between a locking position and an open position. This way, the supporting element may be designed in a relatively compact way.

In an embodiment, the locking element, and in particular the catch, is biased towards a locking position. By biasing the locking element towards a locking position, a larger force is exerted on the second leg member in a locking position. The resulting static friction will therefore also be increased, leading to a tighter fix of the second leg member. It may be possible that a spring or any other biasing element is provided in the house. Multiple springs or biasing elements are of course possible. The spring is arranged for pushing the catch towards a locking position, and for pushing the stopping surface of the catch firmly on the outer surface of the second leg member, increasing the static friction. With this, a supporting element with a rigid locking element providing a secure fit is obtained.

It is possible that at least a part of the catch and/or at least a part of the second leg member is made out of hardened steel. Preferably, at least the part of the catch engaging the second leg member, and the part of the second leg member engaged by the catch, are made out of hardened steel. The coefficient of friction between two surfaces that are both made out of hardened steel is relatively high. More specifically, the coefficient of friction for dry static friction is relatively high in this case, yielding a tight and secure fit.

In an embodiment, the locking element comprises an additional catch that is tiltably movable within the house for alternately acquiring the locking position and the open position of the locking element. The additional catch comprises a cavity receiving the second leg. The additional catch has a stopping surface surrounding a part of the perimeter of the cavity. The stopping surface may surround an additional part of the second leg member, compared to the first catch. The stopping surface may be arranged for engaging at least opposed perimeter parts of the second leg member in a locking position of the locking element. An additional catch will result in an even tighter fixation of the two leg members. It is possible that the catches surround different longitudinal parts of the second leg member. For instance, the second leg member may be fixed at two different axial locations, enabling a rigid and secure fit of the leg member.

In an embodiment, the catch and the additional catch are arranged for tilting in opposite directions towards a locking position. This way, a relatively compact design may be possible. Additionally, it may be possible that the catches engage the second leg member at different angles. This way, the second leg member is fixed even more tightly, and axial movement of the second leg member is prevented.

In an embodiment a biasing element, such as a spring, is positioned between the catch and the additional catch. As the biasing element engages both catches, a biasing force biasing the catches away from each other is obtained. Preferably the tilting the catches away from each other corresponds to tilting the catches to the locking position. In such an arrangement therefore the biasing element biases the locking mechanism to the locked position.

Further the biasing element is preferably a spring coil. The biasing element biasing the locking element to the locked position can be spring coil positioned around a leg member.

This results in a constructional simplification, easing assembly of the supporting element, in particular if a spring coil is used.

It is possible that the locking element comprises a cam that is provided in the house. In an embodiment the house comprises a cam engaging the catch for operating the catch from a locking position to an open position.

In an embodiment opposite sides of the cam may engage the two catches. The cam may be arranged for simultaneously tilting the two catches from a locking position to an open position. The cam enables that the two catches are operated simultaneously. With this, a tight fixation of the leg members is relatively easily obtainable.

In an embodiment, the supporting element comprises a transmission element connected to the locking element and extending towards an outer edge of the leg member. The transmission element may be connected to an operating element provided on the leg member for operating the locking element. This way, the operation of the locking element may be performed at a distance from the actual position of the locking element. The operating element may be provided in a position that is ergonomically reachable by the user, without compromising the compactness of the supporting element. The ergonomical position of the operating element ensures that the supporting elements may be adjusted easily and safely.

In a preferred embodiment, the transmission element is connected to the cam. The transmission element may be connected to the cam by means of a hinge. The transmission element, such as a bar, a rod, a cable or the like, may be arranged such that operating the operating element results in a desired movement of the cam, and furthermore in a tilting movement of one or more catches. The transmission element may be slidably connected to the house. The transmission element may be arranged such that it moves parallel to the first leg member for operating the locking element. The axial movement of the transmission element may be translated via the cam in a tilting movement of one or more catches. This way, a relatively compact supporting element may be obtained.

Preferably, the transmission element is a rigid element, such as a bar or a rod. A rigid element will transfer movements from the operating mechanism to the locking element very accurately. The forces acting on a rigid element will not deform the rigid member, as will be the case when for instance a cable is used. Repetitive strain and deformation of a cable may ultimately lead to failure thereof. This limits the safety of the supporting element, which is undesired. A rigid transmission element may lead to a safer and more accurate supporting element.

According to an aspect of the invention, an apparatus is provided comprising a frame having at least one, preferably at least two legs. It is possible that at least one leg comprises a supporting element according to the invention. The apparatus may be a ladder or a table. The supporting element may be easily and safely adjusted, as has become apparent from the previous description. This way, it is relatively easy to position the apparatus in a desired position. Also, a substantial amount of weight may be supported by such a ladder. A weight of over 150 kg may easily be supported by such an apparatus, having a supporting element according to the invention.

In an embodiment, the apparatus comprises at least three legs, wherein the at least three legs comprise an axially extendible supporting member according to the invention for adjusting the length of each of the at least three legs. The at least three legs are individually and selectively axially extendible with respect to each other for positioning the frame with respect to a horizontal plane. Each supporting element may comprise a transmission element connected to the locking element of the supporting element. Each transmission element extends towards the frame of the apparatus and is connected to a central operating mechanism for activating and deactivating each locking element. The operating mechanism is arranged for activating or deactivating each locking element simultaneously. In this fashion, an apparatus, such as a ladder, a table or a tripod, is obtained, wherein each locking element of each extendible leg may be unlocked at once, using only a central operating element.

The central operation element allows a one operation locking of several legs with a desired length.

Additionally, each leg may be extended individually, meaning that the length of each of the supporting elements may be arbitrarily chosen by the user. The length of one supporting element is not dependent on the length of another supporting element. This, in combination with the central operating element, enables the user to relatively easily and quickly position the apparatus in a desired position. For instance, it may be used for positioning a table or a tripod in a level position, or for positioning a ladder in a stable position on an uneven ground.

It is possible that the operating mechanism comprises an operating handle that is connected to a rod. The rod may be rotatably attached to the frame. The rod may be attached to the frame by means of bearings. The rod may comprise at least two pushing blocks that are positioned at a distance from each other. Each pushing block is arranged for engaging one of the transmission elements. The operating mechanism is arranged such that rotation of the rod by rotating the operating handle results in a translational movement of the transmission element by pushing of the pushing blocks. The transmission element is arranged such that a translational movement of the transmission element results in tilting movement of the catch of the locking element. This way a rigid operating and locking element is obtained, that is reliable and safe.

It is possible that the apparatus comprises a supporting platform, from which the at least three legs extend downwardly. The supporting platform may be used for positioning an object onto it. With the adjustable supporting elements, it is relatively easy to position the supporting platform level.

In one embodiment, the apparatus is a ladder. The ladder may comprise two, three or four supporting elements according to the invention. The ladder may be easily positioned on an uneven ground. When a central operating element is used, the ladder may be positioned relatively quickly and easily.

According to an embodiment the apparatus comprises at least two legs that are hingeably connected with respect to each other. Further the at least two legs each comprise at least one supporting element comprising the locking system according to the invention. The supporting elements of the individual hingeable legs are connected to the central operation mechanism, allowing simultaneous operation of the locking mechanism in each of the hingeable legs.

Although the invention is described and will be described with respect to preferred embodiments, it will be clear that within the scope of the invention, multiple and different embodiments are possible. It is a goal of this application to protect the embodiments described, the embodiments indicated by the claims, as well as equivalents thereof. The person skilled in the art will (now that the advantages of the invention are known) be able to construct different embodiments. It is an intention of the inventor to also protect these embodiments with this application.

In the above, as well as in the following description, aspects of the invention are described and advantages of the measures are described. The inventor intends to protect all the mentioned and unmentioned advantages that the invention has with respect to the state of the art, using this application and/or divisional applications.

BRIEF DESCRIPTION OF THE DRAWING FIGURES

The invention will be described by reference to the following description taken in conjunction with the accompanying drawings in which:

FIG. 3 is a side elevation of a locking element according to an embodiment of the invention;

FIG. 4a is a side elevation of the supporting element of FIG. 3 in a locked position; FIG. 4b shows a detail of the locking mechanism of FIG. 4a;

FIG. 5a is a side elevation of the supporting element of FIG. 3; FIG. 5b shows a detail of the locking mechanism of FIG. 5a;

DETAILED DESCRIPTION OF THE INVENTION

Figure 1:
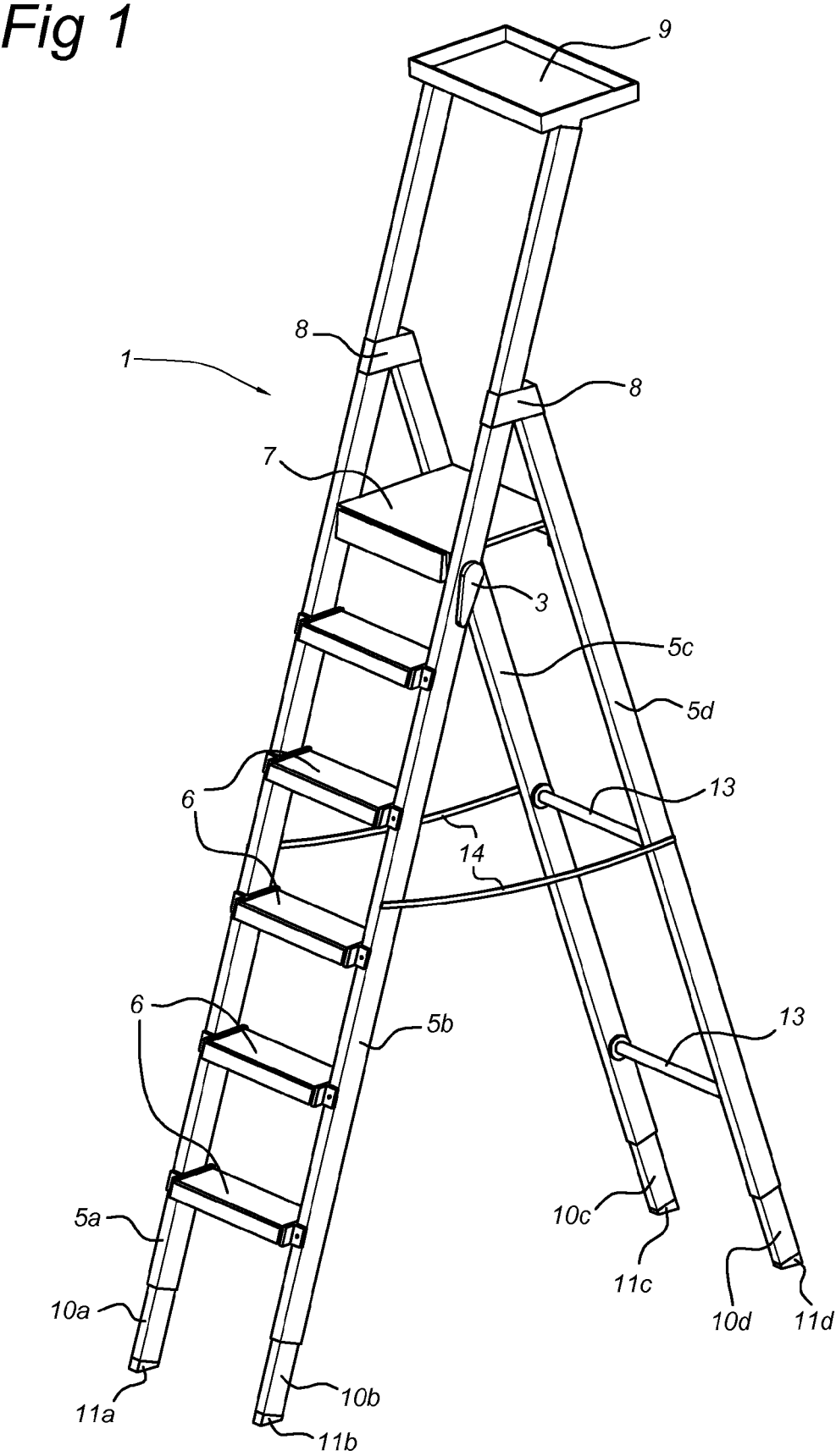
FIG. 1 is a perspective view of a ladder.

FIG. 1 shows a ladder 1 in a perspective view. The ladder 1 comprises two front legs 5a,5b and two rear legs 5c,5d. The front legs 5a,5b are horizontally spaced from each other by several steps 6 that may be positioned at regular longitudinal intervals from each other. At the upper end of the two front legs, a bucket tray 9 is provided. The front legs 5a,5b, the steps 6 and the bucket tray 9 are part of a front frame. The rear legs 5c,5d are horizontally spaced from each other by two connecting bars 13. The rear legs 5c,5d and connecting bars 13 are part of a rear frame. The front frame and rear frame are hingeably connected to each other by means of hinging points 8. A top step 7 connects the front frame to the rear frame, and assures a stable and fixed angular position between the front frame and the rear frame. To this end, two spacing members 14 are also provided between the front frame and the rear frame. The top step 7 may be rotatably connected to the rear frame, in a manner that is well known to those skilled in the art. The top step may be detached from the front frame, enabling the rear frame to hinge over hinging points 8 towards the front frame. This way, the ladder may be positioned in a folded position, wherein the rear legs are relatively closely spaced and parallel to the front legs.

As is shown in FIG. 1, each leg 5a-d comprises an extendable leg portion 10a-d. Each system of a leg 5 and an extendable leg portion 10 forms a supporting element 2. The leg may be viewed as a first leg member, and the extendable leg portion may be viewed as a second leg member. The two leg members are a part of the supporting element 2. Each leg portion 10a-d has a foot portion 11a-d. The extendable leg portions 10a-d may move axially relative to the legs 5a-d. At one side of front leg 5b, an operating handle 3 is provided. As will be discussed later, a locking mechanism 200 is provided for locking the relative axial movement of the extendable leg portion and the leg. The locking mechanism comprises a locking element. The operating handle 3 is used to lock and unlock the locking element or locking mechanism 200. In a locked position, the extendible leg parts are unable to move relative to the legs. In an unlocked position or open position, relative movement between the legs and the extendible leg parts is possible. The extendible part may be able to move a certain length with respect to the leg. The length over which movement is possible, may for instance be 20 cm. Other lengths are possible.

In another embodiment a table having one or more legs, in particular one or more hingeable legs connected thereto is provided. An central operating mechanism can be connected to the frame or tabletop.

Figure 2:
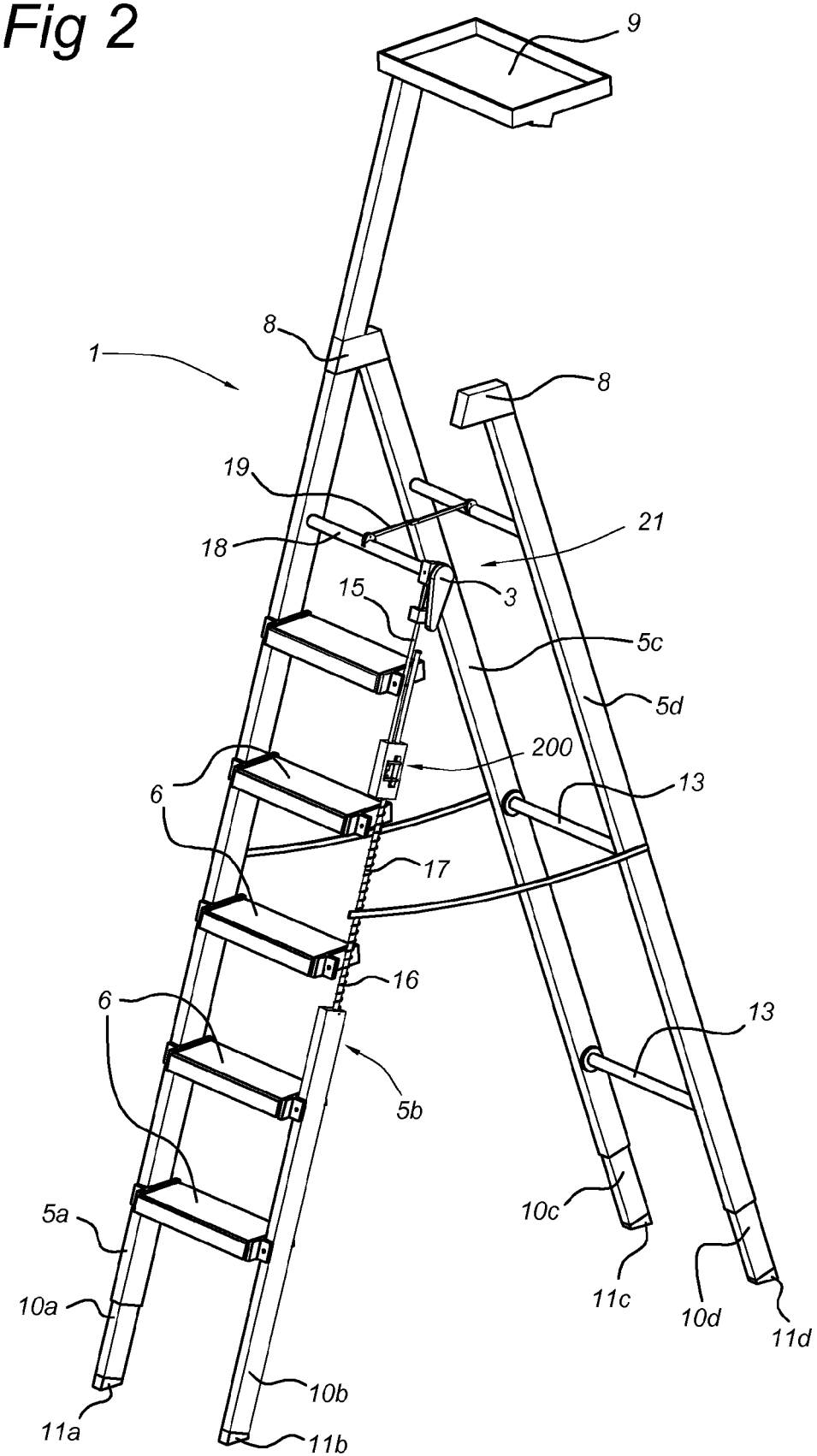
FIG. 2 is an exploded view in perspective of a ladder, showing in more detail an embodiment of the supporting element with a locking element and an operating mechanism.

FIG. 2 shows an exploded view of the ladder 1 from FIG. 1. Likewise elements are referred to with similar numerals. In this figure, the top step 7 and the front leg 5b are removed, thereby showing in more detail the operating mechanism 21 and locking mechanism 200 of the ladder 1. Each extendable leg portion 10a-d comprises a sliding bar 16 that is slidably received in the locking mechanism 200. A spring 17 is connected between a house of the locking mechanism 200 and the lower part of the extendable leg portion 10a-d. Another bar 15 is slidably received in the locking mechanism 200, and extends towards the upper part of the ladder 1. There, the bar 15 engages the operating mechanism 21. The operating mechanism 21 comprises two rods 18. Each rod 18 is rotatably connected between either the front or the rear legs. As an example, the rod may be attached to the frame by means of bearings. The two rods are positioned parallel to each other, and are connected by means of a connecting rod 19. The rod 18 has at one end a handle 3. The handle 3 may be used to lock and open the operating mechanism 200, as will be described later.

FIG. 3 shows a side elevation of an embodiment of a part of a supporting element, comprising a locking mechanism 30 having a locking element 34, 35. FIG. 4a-b and FIG. 5a-b show further details of the supporting element 2 of FIG. 3. FIG. 4 shows the locking mechanism 30 in a locked position. FIG. 5 shows the locking mechanism 30 in an open position. Likewise elements are referred to with similar numerals. The locking mechanism 30 comprises a house 32. It is noted that the figures schematically show the locking mechanism and other parts. These figures are not to scale. In the embodiment shown, the house 32 is attached to the first leg member 22, as can be seen from FIG. 4 and FIG. 5. The first leg member 22 and the second leg member 20 are part of the supporting element 2. At one end of the house 32, a sliding bar 33 is slidably received. The sliding bar may slide in an axial direction. At an upper end of the sliding bar, a stop is provided, to limit the extension (i.e. downward movement) of the sliding bar. The sliding bar 33 is connected to a lower leg part 41. The sliding bar 33 and the lower leg part 41 are part of a second leg member 20. The lower leg part 41 has a foot part 42 for stable placement of the ladder, or another object provided with a supporting element 2, in a used position. Around the sliding bar 33 a spring 44 is positioned. The spring extends between the outer side of the house 32 and the upper part of the lower leg part 41. At the other end of the house 32, a transmission element 31, such as a transmission rod 31, is slidably received. In the house a spring 43 is provided, thereby contacting one end of the transmission rod 31. More upwards, the transmission rod is also slidably received in a guiding block 46. An upper end of the transmission rod 31 engages a pushing block 50, that is connected to a turning bar 48. The pushing block 50 and turning bar 48 may rotate around the centre line of the turning bar. It is possible that a corner of the pushing block rests on a surface in a locked position of the locking mechanism 30. For instance, it may be possible that the lower right corner of the pushing block 50 may rest on the guiding block 46, and/or that the upper right corner rests on the inner part of the first leg member 22, in a locked position of the locking mechanism 30. This way, rotation of the pushing block in one direction is prevented. This ensures that only a small rotational movement of the pushing block, and thus a small rotational movement of the operating handle 3, is sufficient for disengaging the locking mechanism.

In the house, a cam 36 is connected to the transmission rod 31 at a hinge point 51. The cam 36 may engage two catches 34, 35. One catch 34 is provided at an upper end of the cam, and one catch 35 is provided at a lower end of the cam 36. An upper side 141 of the cam engages catch 34, and a lower side 142 of the cam 36 engages catch 35. The cam may be made in the shape of a butterfly, i.e. having two legs that extend round the sliding bar 33. Each catch 34, 35 has one side thereof positioned in a groove 52, 53 of the house. The catch 34, 35 may tilt, or rotate, in the house around a rotation axis formed by the lengthwise direction of the groove 52, 53. It is noted that in the embodiment shown, the catch 34, 35 has no fixed axis of rotation within the housing. The catch is not connected to the house, but may freely move in the house 34 and in the cavity 52. The outer end of the catch may move in a horizontal plane. With this, less parts are needed, and thus the locking mechanism may be simplified, without compromising a tight and safe locking of the two leg members.

A perspective of an embodiment of the catch 34 is shown in FIG. 3b. The catch has a cavity 40 formed therein. The sliding bar 33 of the second leg member 41 is slidably received in the cavity 40 of the catch 34 (see FIG. 3a). The cavity 40 may be cylindrical in shape, although other shapes are possible. The catch has a stopping surface 47. The stopping surface may comprise the inner shell of the cavity 40. Preferably, the stopping surface includes the edge 45 of the cavity 40 with the outer surface 54 of the catch 34. At the bottom of the catch 34, a similar edge exists. Additionally, another cavity 49 may second U-shaped cavity 49 is provided in the catch.

The operating of the locking mechanism 30 will be explained next. In a locked position, shown in FIGS. 4a and 4b, the transmission rod 31 is in an upward position, wherein hinge point 51 of the cam 36 is also lifted upwards. The outer surfaces of the cam is designed in order to enable the catches 34, 35 to rotate or tilt towards the centre of the house 32. When tilted, different parts of the stopping surface 47 of the cavity 40 of a catch 34, 35 will engage the sliding bar 33. More specifically, at least the two edges 45 of the cavity 40 that will engage the sliding bar 33. Hereby, parts of the two edges 45 on both sides of the cavity 40 will contact the sliding bar 33. The edges may press into the sliding bar. The edges may also cut into the sliding bar 33. This ensures that a high locking pressure is obtained, and prevents the relative movement of the two leg members. The upper edge 45, and the lower edge engage with parts that are facing each other. Therefore, opposite perimeter parts of the second leg member 41, i.e. the sliding bar 33 are engaged. This imposes a moment on the sliding bar 33. As a result the sliding bar 33 is pressed to both the house 32 and to the stopping surfaces 47. The sliding bar 33 is thus jammed by the catch 34 and the house 32. Each contact point will yield static friction, which prevents the sliding bar 33 from sliding in the house 32. It will therefore be impossible for the sliding rod to move, and thus elongation of the leg is impossible.

It is noted that only a single catch 34 may be sufficient in order to fix the sliding bar 33. The additional catch 35 is positioned longitudinally from the first catch. This additional catch, in combination with the first catch 34 ensures a tight fix. It can be seen in FIG. 2 that the catches 34,35 will tilt in different directions. With this, prevention of movement in both directions is ensured. Also, a tight fix is assured.

The springs 38,39 that are provided next to the catches 34,35 also ensure that the catches 34,35 are rotated or tilted towards the centre of the house 32. The springs 38,39 ensure that the catches 34,35 are pushed towards a locked position. The springs 38,39 also ensure am increased engagement of the stopping surfaces 47 on the sliding bar 33. With this, a tight and safe fix of the sliding bar 33 in the locking mechanism is achieved. In the embodiment shown, the springs are positioned parallel to, and around the sliding bar 33 of the second leg member 20. This positioning is compact and convenient, and allows for easy assembly of the supporting element. Other positions are possible however. Other means of biasing the catch towards a locking position are possible. For instance, a spring that is positioned near to the transmission bar 31, and connected to botch catches 34,35, may be used to pull the two catches 34,35 towards each other, thus biasing the two catches towards a locking position.

Unlocking the locking mechanism 30 may be done as follows. By rotating the pushing block 50 around pivot point 48, the transmission bar 31 is moved downwardly. The result will be that the hinge point 51 of the cam 36 will also move down. The cam and house are arranged such that this downward movement will result in rotation of the cam 36 around rotation point 51. The cam 36 is arranged such that the combined movement results in simultaneously tilting the two catches from a locking position to an open position. The movement of the cam 36 will lead to movement of the upper and lower surfaces of the cam 36, resulting in a tilting movement of both catches 34,35 towards an outside part of the house 32. Resultantly, the stopping surface of the cavity will then be positioned at a certain distance from the sliding bar 33, enabling movement of the sliding bar within the house 32. With this, the leg of the ladder may be extended or shortened in an axial direction.

It is noted that in a locked position of the locking mechanism, the cam 36 may freely rotate around hinge point 51. It is possible that the outer surfaces of the cam are not in direct contact with the catches 34,35. In that case, movement of the transmission bar 31 may be necessary to bring the outer surfaces of the cam into contact with the catches, enabling movement of the catches towards an open position. With this, the locking mechanism may only be brought to an open position by actual movement of the transmission bar. This ensures that the user intends to open the locking mechanism, and prevents accidental opening of the locking mechanism.

In an unlocked position, a longitudinal axis of the cavity 40 extends parallel to the sliding bar 33. This ensures that the area through which the sliding bar 33 may be slided is maximal, i.e. that there is a maximal aperture for the sliding bar 33. Accidental lock-ups may be prevented with this.

In an unlocked position, the spring 44 around the sliding bar 33 biases the extendible leg part 41 towards an extended position. Preferably, the force of the spring is designed such that it balances the weighing force of the object to be supported. This way, releasing the locking mechanism 30 will only result in the extendable leg being extendable, without actually sliding within the house 32. Releasing the locking mechanism therefore does not result in an active shortening of the extendible leg due to gravitational forces. When multiple legs are used, the force of each spring is chosen such that the combined forces of the springs balance the weighing force of the object to be supported. The multiple springs may each have a different spring force, dependent on the weight distribution of the object to be supported. An object, such as a ladder, provided with a number of supporting elements according to this embodiment, is relatively easy to position in any desired fashion. The effort needed to change the orientation of the object is relatively small, since the object is more or less self supported by the biased springs.

When the rotational force on the pushing block 50 is removed, the actions of the springs 38,39 near the catches 34,35, as well as the actions of the spring 43 near the transmission rod 31, will lead the transmission rod to move upwards, thereby locking the locking mechanism 30.

Figure 6:
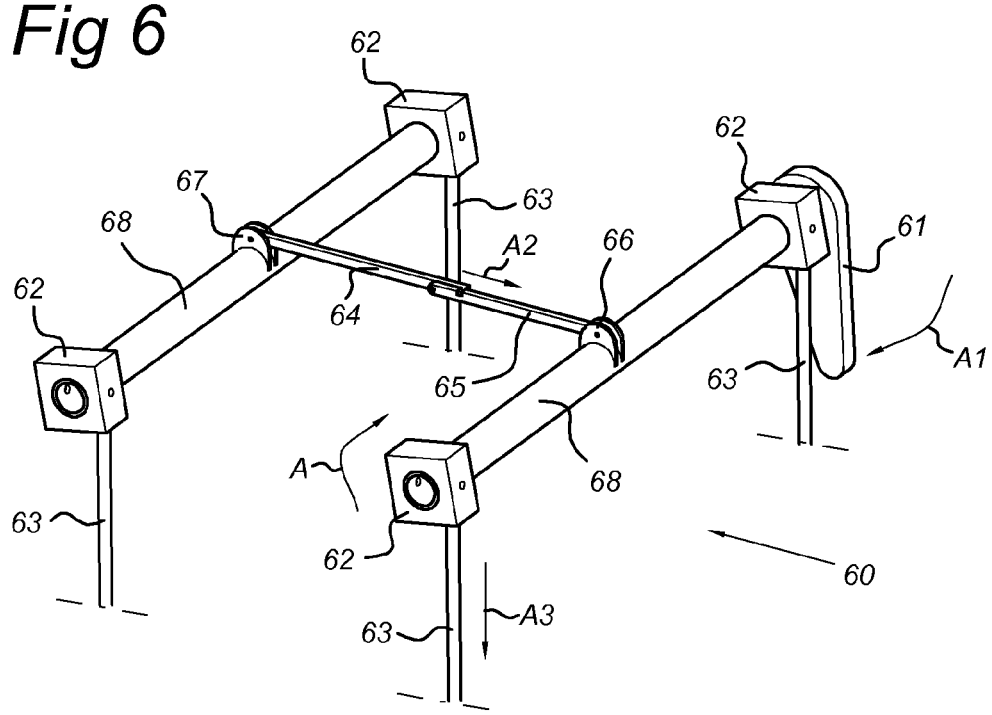
FIG. 6 shows a perspective view of an operating mechanism for operating a locking element.
Figure 7:
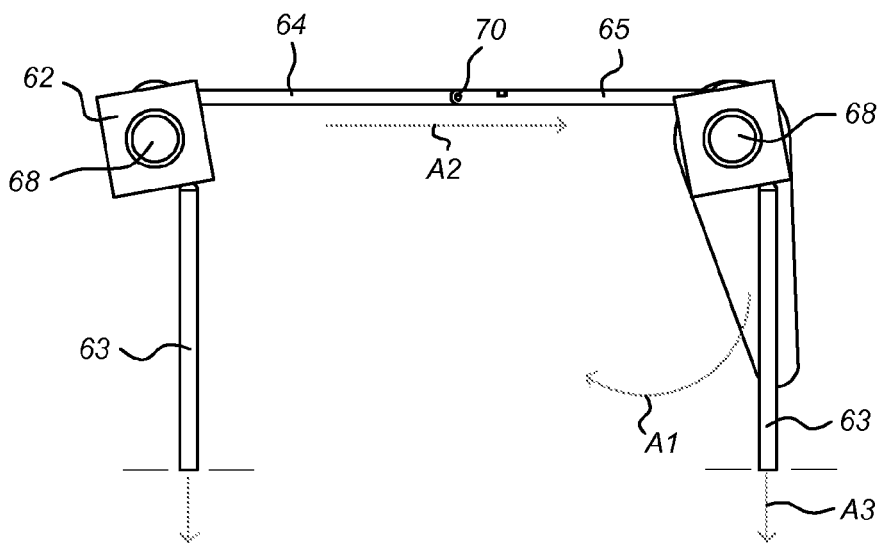
FIG. 7 is a side elevation of the operating mechanism of FIG. 6.

It is desired that an object having several extendable legs, such as a ladder, may be operated by a central operating mechanism. FIG. 6 and FIG. 7 show an embodiment of an operating mechanism 60 suitable for this task. The operating mechanism 60 comprises two turning rods 68, positioned at a distance from each other. The turning rods 68 may be positioned mainly parallel in a flat surface, such as is shown in FIG. 4. The turning rods 68 are connected by means of a connecting rod 64,65. The connecting rod 64,65 is connected to each turning rod 68 by means of a bulge 66,67. At each outer end of the turning rods 68 pushing blocks 62 are positioned. The pushing blocks are rigidly connected to the turning rods 68. At a lower surface of each pushing block 62, transmission bars 63 are provided. In the embodiment shown, the transmission bars 63 engages the lower surface of the pushing block 62, and no fixed connection is present between the two. The transmission bars 63 may be connected to a locking mechanism, as described earlier. At one end of one turning rod 68, a handle 61 is provided. The handle may be used by someone for operating the locking mechanisms of several extendable leg portions all at once. It is noted that the operating mechanism shown in FIG. 6 may be used in combination with any supporting element, regardless of the kind of locking mechanism used in the supporting element.

By rotating the handle 61 in the direction of arrow A1, the turning rod is rotated. The rigid connection between the two turning rods, the connection being formed by rigid connecting rod 64,65, will move also in direction of arrow A2. This results in a likewise rotation of the second rod 68. Thus, both rods 68 will rotate over an equal angle. Also, all pushing blocks 62 will rotate equally, thereby pushing each transmission bar 63 in a downward direction. As described before, the downward movement of the transmission bar 63 will enable a locking mechanism to get to an idle state. With this, an extendable leg may be positioned in any desired fashion.

It is pointed out that the extension of the leg is not coupled in any manner to the transmission bar 63. As can be seen from FIG. 2, the transmission bar 63 will only be used for locking and unlocking the locking mechanism of an extendable leg. It is therefore noted that all leg members may be extended independently from each other. In other words, the length of each of the leg members may be chosen arbitrarily. The length of one leg does not form a restriction to the length of another leg. Thus, the user may adapt each of the extendible legs of an object in any manner desirable. These degrees of freedom enable a user to position the object at a desired height (within the limitations of the extendible legs), and also to position the object at a certain angle with respect to the base on which the object is standing. An additional advantage is that the locking mechanism of each extendible leg may be operated with a central operating mechanism, enabling the user to easily set up his object. The object may be a table, or a ladder, or any other object benefiting from the use of extendible legs, such as for instance a tripod.

The supporting element may be assembled in a relatively fast and easy way. Assembly will be discussed with reference to FIGS. 4 and 5. First, the second leg member 20 may be prepared. The sliding bar 33 may be positioned in the house 32, by sliding a lower end of the sliding bar through the top opening of the house 32. During this step, the two catches 34,35 and the two springs 38,39 may be installed. When the sliding bar is in place, the spring 44 may be fitted on the sliding bar. Next, the lower part 41 of the second leg member 20 may be attached. Then, the transmission bar 31 may be installed in the housing, by sliding the bar 31 into the intended top opening of the house 32. The spring 43 is also positioned. When the bar 32 and spring 43 are in place, the cam 36 may be connected and attached to hinge point 51. Furthermore, the guiding block 46 may be installed. It will be obvious for a person skilled in the art, that the positioning of the sliding bar 33 and the transmission bar 31 may be done in a different order. The combination of the locking mechanism 30, the second leg member 20 and the transmission bar 31 with guiding block 46 may be slid into the hollow first leg member 22. The hollow first leg member may be an extruded profile. The house 32 and other parts may be aligned in a method known to a skilled person, and may then be attached to the second leg member using fastening means, such as for instance rivets.

Figure 8A:
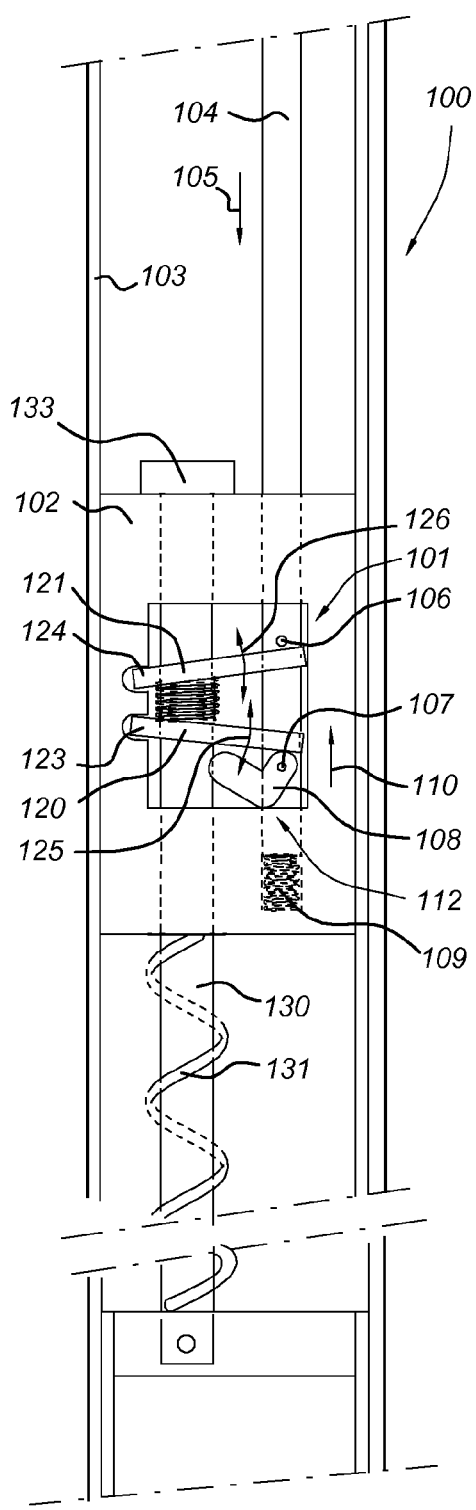
FIG. 8a is a side view of another embodiment of a locking mechanism in a locked position.

FIG. 8a shows a further embodiment of a leg or supporting element 100 having a locking mechanism 101. A house 102 is mounted in a first leg member 103. A transmission element 104 is formed by a rod. It can be connected to a central operating mechanism at a distance from the locking mechanism. Due to the rod's stiffness a movement in the operating mechanism can be transferred to the locking mechanism 101. Transmission element 104 can move axially in the leg 100 according to arrow 105. The movement can be guided by house 102 having a suitable bore receiving the transmission element 104.

A biasing element 109 provides a biasing force in the direction of arrow 110 on the transmission element 104.

Transmission element 104 has a first pin 106. Further a hinge 107 is provided connected to cam 108. Cam 108 rests on a house part 112.

Figure 8B:
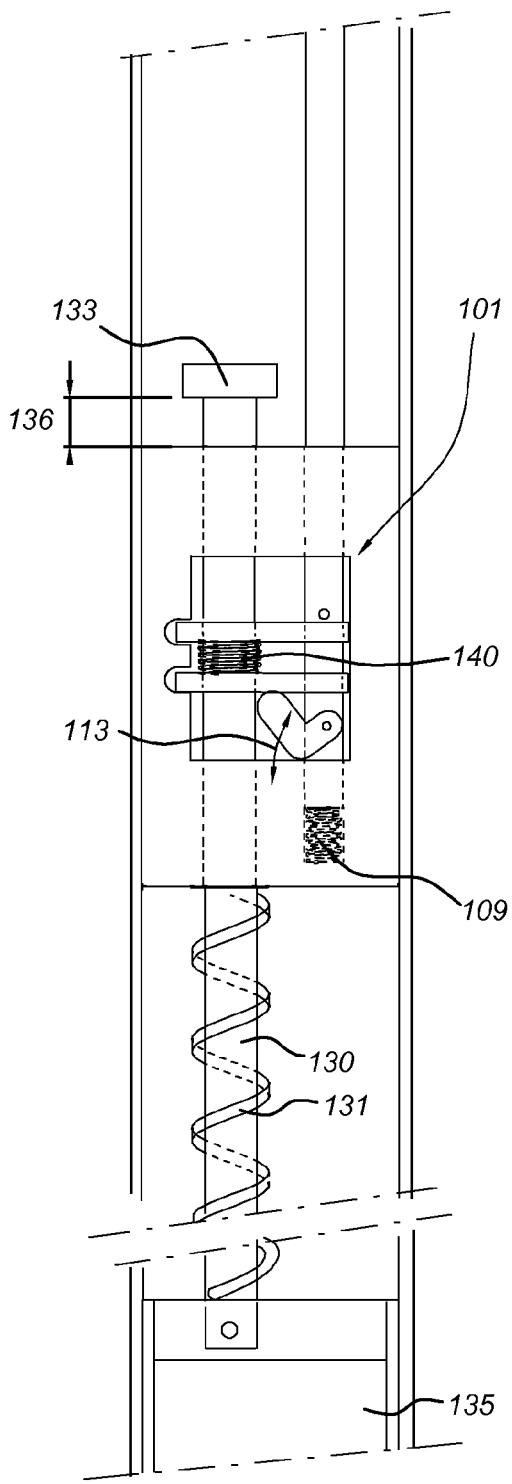
FIG. 8b is a side view of the embodiment according to FIG. 8a in an unlocked position.

From the position shown in FIG. 8a, transmission element 104 can move in the direction of arrow 110 to the position shown in FIG. 8b. FIG. 8a shows a locking position of the locking mechanism 101 and FIG. 8b shows a unlocked position.

If the transmission element 104 is moved, cam 108 will rotate according to arrow 113 around hinge 107. A tip 114 of cam 108 engage catch 120. Simultaneously pin 106 will engage catch 121. Catches 120 and 121 can have an embodiment similar to FIG. 3b.

End parts 123,124 of the catches 120 and 121 are received in a cavity in house 102 and allow a tilting motion of the catches according to arrow 125 and 126 respectively.

The catches 120, 121 have a cavity receiving a second leg member 130. A biasing element 131, e.g. a spring, engages on the housing 102 and the second leg member 130 providing a biasing force towards extending the leg or support member 100 in the axial direction. Second leg member 130 is received telescopically in the first leg member 103 and can slide in the axial direction 105.

In the position according to FIG. 8a, the cavities in the catches 120,121 are tilted and a perimeter of the cavities will engage on the outer surface of the second leg member 130. If tilted sufficiently the engaging force will lock the second leg member in a locked position and the leg or support element 100 will have a fixed length.

A further biasing element 140, again a spring in this embodiment, surrounds the second leg member 130 in this embodiment. Biasing element 140 engages on both catches 120,121 and provides a force in the axial direction, forcing the catches away from each other.

If moved to the unlocked position according to FIG. 8b, the second leg member 130 can move freely with respect to the first leg member 103 or house 102 and the length of the leg 100 can be axially adapted. The biasing element 131 biases in the extended direction.

The biasing force in the extended direction can e.g. be similar to the mass of the supporting element 100. In an embodiment the biasing force is similar to the mass near an equilibrium position/length of the leg 100. This will provide a 'floating sensation' if the apparatus to which the leg 100 is connected is positioned on a surface.

Second leg member 130 has a stop 133 that can engage on house 101 limiting the length of axial extension.

From the unlocked position according to FIG. 8b, the locking mechanism can be brought to the locked position by axially moving the transmission element 104, allowing the catches to tilt according to arrows 125, 126, away from each other, biased by the biasing element 140.

As a result of unlocking, leg member 130 moved upwards by a distance indicated by arrow 136. The part 135 of leg member 130, directly connected to the leg member, was guided in the frame of the first leg member 103 over the same distance 136 in a sliding arrangement.

By moving a distance 136 upwards, the biasing force from spring coil 131 was overcome resulting in a work load W. This work could be provided by the mass/weight of the ladder/table that the support 100 supports. The weight of the ladder/table is now supported by the support 100 and in particular the spring 131, resulting in a sort of floating sensation for an operator pushing against the first leg member 101.

In an embodiment a further pin can be positioned on the transmission element at the other side of catch 121.

In another embodiment a further biasing element can be positioned around transmission element 104 between catches 120 and 121, biasing the catches 120,121 in the tilted position according to FIG. 8a.

Variations on the embodiments shown are imaginable, without diverting from the main notion of the invention. It will be clear that the invention is described by using preferred embodiments. The invention is not intended to be limited to these embodiments.

The invention claimed is:

1. Apparatus comprising a frame having at least three legs, wherein each one of the at least three legs comprises a supporting element comprising a first leg member and a second leg member, wherein the first leg member is axially movable relative to the second leg member for axially extending the supporting element, and wherein the first leg member comprises a house that is arranged for slidably receiving the second leg member, and wherein the house comprises a locking element having a locking position for locking the relative axial movement of the first leg member with respect to the second leg member, and having an open position for enabling relative axial movement of the two leg members, the locking element comprising a catch that is tiltably movable within the house for alternately acquiring the locking position and the open position of the locking element, wherein the catch comprises a cavity receiving the second leg member, wherein the catch comprises a stopping surface surrounding a perimeter of the cavity, wherein the stopping surface is arranged for engaging at least two opposed perimeter parts of the second leg member in the locking position of the locking element, wherein the supporting element further comprises a biasing element for biasing the supporting element towards an axially extended position, wherein each supporting element of each one of said at least three legs comprises a transmission element connected to the locking element of the respective supporting element, wherein each transmission element of each supporting element of each one of said at least three legs is connected to a central operating mechanism for simultaneously activating and deactivating each locking element of each supporting element of each one of said at least three legs.

2. Apparatus according to claim 1, wherein the central operating mechanism comprises an operating handle connected to a rod that is rotatably attached to the frame, the rod comprising at least two pushing blocks that are positioned at a distance from each other, wherein each pushing block is arranged for engaging one of the transmission elements, wherein the central operating mechanism is arranged such that rotation of the rod by rotating the operating handle results in a translational movement of the transmission element by pushing of the pushing blocks, and wherein the transmission element is arranged such that a translational movement of the transmission element results in a tilting movement of the catch of the locking element.

3. Apparatus according to claim 2, wherein at least two legs are hingeably connected with respect to each other and wherein the central operating mechanism is arranged for activating and deactivating the locking elements in the at least two legs hingeably connected with respect to each other.

4. Apparatus according to claim 1, wherein at least two legs are hingeably connected with respect to each other and wherein the central operating mechanism is arranged for activating and deactivating the locking elements in the at least two legs hingeably connected with respect to each other.

5. Apparatus according to claim 1, wherein the apparatus comprises a supporting platform, from which the at least three legs extend downwardly.

6. Apparatus according to claim 1, wherein the apparatus is a ladder.

* * * * *